Dec. 9, 1930.                G. A. KING                1,784,361
            MEANS FOR ATTACHING SEAT COVERS AND THE LIKE
                      Original Filed Nov. 1, 1927
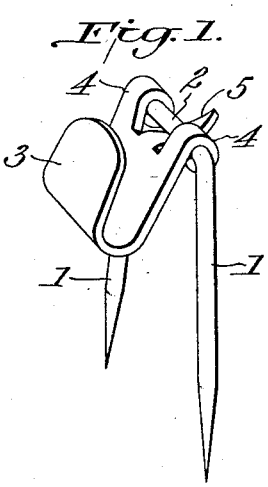
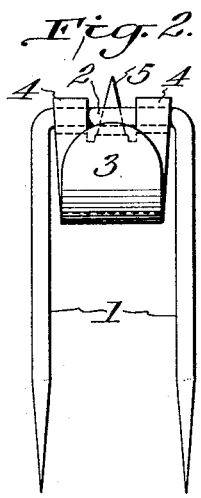 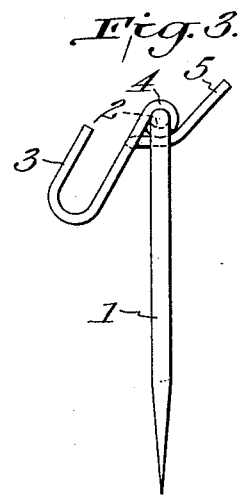
Inventor
George A. King
by
*Attorney*

Patented Dec. 9, 1930

1,784,361

UNITED STATES PATENT OFFICE

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT

MEANS FOR ATTACHING SEAT COVERS AND THE LIKE

Original application filed November 1, 1927, Serial No. 230,287. Divided and this application filed March 26, 1929. Serial No. 350,019.

The subject of this invention is a division, made upon requirement of the Patent Office, of my application for patent for means for attaching seat covers and the like, filed November 1, 1927, Serial No. 230,287, Patent No. 1,768,454, granted June 24, 1930.

The present case has to do with the hook pin of the invention disclosed in the said application.

The invention herein has particular reference to a hook pin designed primarily, but not exclusively, for use in attaching covers to automobile parts.

The hook pin comprises a pin portion adapted to be stuck in the upholstery or other part upon which it may be used for supporting another object thereon, the head of the pin having hingedly applied thereto a hook having one portion adapted to be engaged with the seat cover or other object adapted to be removably attached to the first mentioned part, and preferably another portion which may be engaged with the upholstery or other part to anchor the pin in such part, as I will proceed now more fully to explain and finally claim.

In the accompanying drawings illustrating the invention, in the several figures of which like parts are similarly designated, Figure 1 is a perspective view; Fig. 2 a front elevation, and Fig. 3 a side elevation of the hook pin of this invention.

The particular form of hook pin, or engaging device, herein shown, comprises a double pointed pin 1, preferably made of a piece of wire bent upon itself, and having hinged to its bend or head 2, a swinging hook 3, which is adapted to be engaged with a part to be removably applied to another part, especially through the medium of an elastic part applied to such removable part and adapted to be engaged by the hook.

The hook has the spaced-apart knuckles 4, which are applied to the bend or head 2 in hinge-fashion, so that the hook may freely swing on the bend or head of the pin to adjust itself to the adjacent objects or parts.

Between the knuckles 4 the hook member has a rearwardly and upwardly extending prong 5 which is adapted to enter the upholstery or other part, to prevent the accidental escape of the pin.

In the use of the hook pin, the pin points are stuck into the upholstery or other object in position to be properly engaged by the seat cover or other part to be applied, with the hook portion inverted, and then when the pin points have been driven in as far as possible, the hook is turned on the bend or head of the pin into a position approaching the pin points, and in bringing the hook into this position, the prong 5 will be forced into the upholstery or other part and engaged therewith in such manner as to hold the pin from upward displacement.

Variations in the details of construction and arrangement of parts are permissible within the principle of the invention and the scope of the claims following.

What I claim is:—

1. Means for attaching seat covers and the like, including a hook pin consisting of an attaching pin portion having a bend or head and a hook hinged to said bend or head and adapted to swing freely on said bend or head.

2. Means for attaching a seat cover and the like, including a hook pin consisting of an attaching pin, a hook hinged thereon, and a prong extending rearwardly and upwardly from the hinged end of the hook.

3. A hook pin, comprising a double pointed sticking pin, the points connected by a bend in the constituent material, and a hook having knuckles applied in hinge-fashion to the bend of the double pointed pin.

4. A hook pin, comprising a double pointed sticking pin of wire, the points connected by a bend in the constituent wire, a hook having knuckles applied in hinge-fashion to the bend of the double pointed pin, and a rearwardly and upwardly extending prong.

5. A fastener comprising a double pointed pin having a U-shaped head including a cross bar, a plate having a fastener element and a hinged member applied to the cross bar between the limbs of the pin and a locking element on the plate extending rearwardly therefrom.

6. A fastener comprising a double pointed pin having a head affording a cross bar and a plate hinged to the cross bar between the limbs of the pin and provided with a rearwardly extending prong adjacent to the cross bar of the pin head and extending upwardly when in use.

In testimony whereof I have hereunto set my hand this 22 day of March, A. D. 1929.

GEORGE A. KING.